United States Patent

Hunter et al.

[11] Patent Number: 5,834,628
[45] Date of Patent: Nov. 10, 1998

[54] ACTIVITY WEIGHTED PARTICLE SIZE DISTRIBUTION SYSTEM

[75] Inventors: Scott R. Hunter; Harvel A. Wright, both of Knoxville, Tenn.

[73] Assignee: Consultec Scientific, Inc., Knoxville, Tenn.

[21] Appl. No.: 748,493

[22] Filed: Nov. 8, 1996

Related U.S. Application Data

[60] Provisional application No. 60/006,508 Nov. 9, 1995.

[51] Int. Cl.$^6$ ....................................... G01V 5/00
[52] U.S. Cl. ........................................ 73/28.04; 250/255
[58] Field of Search ............................ 73/865.5, 28.04; 250/489, 282, 283, 284, 288, 432 R, 253, 255; 55/270

[56] References Cited

U.S. PATENT DOCUMENTS

| | | |
|---|---|---|
| 3,555,278 | 1/1971 | Schroeder . |
| 3,564,245 | 2/1971 | Koehler . |
| 3,922,555 | 11/1975 | Chapuis et al. . |
| 4,469,945 | 9/1984 | Hoeberechts et al. . |
| 4,484,076 | 11/1984 | Thomson . |
| 4,489,315 | 12/1984 | Falk et al. . |
| 4,516,028 | 5/1985 | Riggan . |
| 4,570,494 | 2/1986 | Dunn et al. . |
| 4,607,165 | 8/1986 | Burghoffer et al. . |
| 4,847,503 | 7/1989 | Tetley et al. . |
| 4,871,914 | 10/1989 | Simon et al. . |
| 4,963,730 | 10/1990 | Tetley et al. . |
| 5,026,986 | 6/1991 | Hurst . |
| 5,204,528 | 4/1993 | Hurst et al. . |

Primary Examiner—Robert Raevis
Attorney, Agent, or Firm—Sughrue, Mion, Zinn, Macpeak & Seas, PLLC

[57] ABSTRACT

A system for measuring the size distribution of particles on which radioactive atoms are attached including: an air flow channel for receiving an influx of the radioactive atoms, a fan for controlling the air flow rate in the channel, one or more wire mesh screens in the channel, and alpha particle detectors located in the channel so as to detect the radioactive atoms. The outputs of the detectors may be connected to a computer for analysis of the outputs.

17 Claims, 12 Drawing Sheets

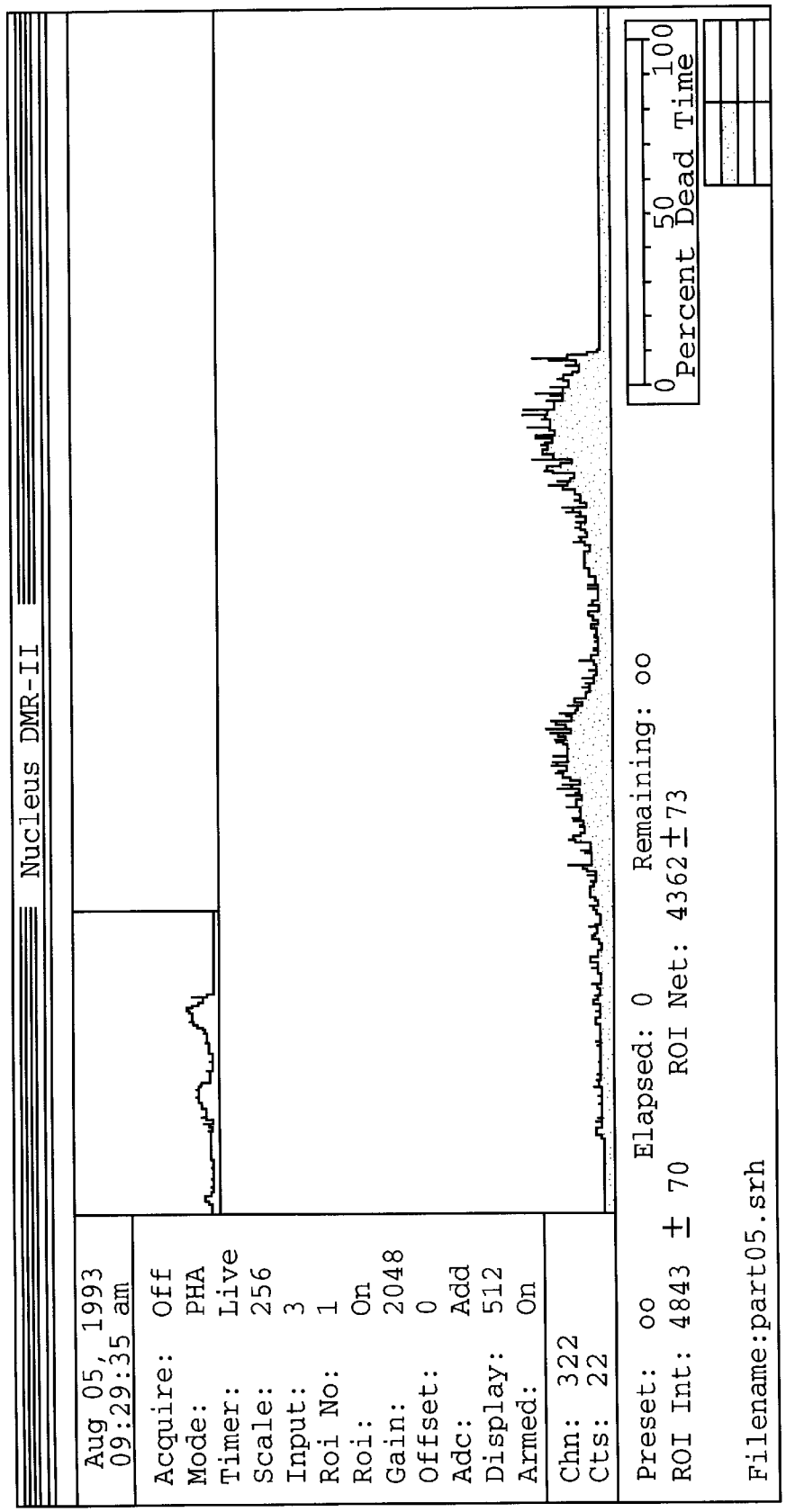

FIG. 3(b)

Nucleus DMR-II

Aug 05, 1993
09:30:08 am

Acquire: Off
Mode: PHA
Timer: Live
Scale: 256
Input: 1
Roi No: 1
Roi: On
Gain: 2048
Offset: 0
Adc: Add
Display: 512
Armed: On Chn: 0
Cts: 1

Preset: ∞    Elapsed: 0    Remaining: ∞
ROI Int: 2113 ± 46    ROI Net: 2014 ± 47

Filename:part05.srh

0  Percent Dead Time  100

(1) 15532 COUNTS
(2) 628 COUNTS
(3) 358 COUNTS
(4) 4003 COUNTS (1) 9941 COUNTS (2) 331 COUNTS (3) 258 COUNTS (4) 3291 COUNTS (1) 28746 COUNTS
(2) 4832 COUNTS
(3) 182 COUNTS
(2) 1271 COUNTS (1) 3506 COUNTS (2) 2222 COUNTS (3) 3071 COUNTS (4) 7745 COUNTS (1) 2853 COUNTS (2) 697 COUNTS (3) 1333 COUNTS (4) 8244 COUNTS (1) 6015 COUNTS
(2) 1782 COUNTS
(3) 1757 COUNTS
(4) 1815 COUNTS (1) 3532 COUNTS
(2) 1592 COUNTS
(3) 1503 COUNTS
(4) 9900 COUNTS

ACTIVITY WEIGHTED PARTICLE SIZE DISTRIBUTION SYSTEM

The invention described herein was developed with support from the U.S government under Grant No. NIH 5R44 CA59071-03. The government has certain rights to this invention.

This application claims benefit of USC Provisional Appln. No. 60/006,508, filed Nov. 9, 1995.

1. Field of the Invention

The present invention is directed to a system for measuring the size distribution of particles on which radioactive atoms are attached. The present invention is particularly suitable for measuring, for example, the size distribution of particles on which radon atoms are attached.

2. Background of the Invention

It is well known that the radon itself poses little health hazard. The principal health risk is lung cancer resulting from the concentration of alpha-emitting radon progeny near sensitive cells within the lungs of a person exposed to the radon containing environment. Measurement of the size distribution of particles to which the radon progeny are attached provides critical information for determining the fate of the radon progeny within the human respiratory tract. As air is breathed in through the nose or mouth most of the ultrafine particles below 2 or 3 nm in size will be deposited there posing little hazard. However, particles of size from a few nanometers to a few of tens of nanometers are likely to penetrate the nasal cavity and be deposited in the lungs. Particles of size from a few tens of nanometers to a few microns are likely to penetrate into the lungs but be breathed out again and thus not deposited. Particles above a few microns in size are likely to be inertially deposited in the nasal cavity. Thus a knowledge of the size distribution of the particles containing the radon progeny is critical to determining where within the respiratory tract the radon progeny will be deposited and, indeed, whether they will be deposited at all.

Heretofore measurements of the particle size distribution have been extremely difficult to make. Thus the term unattached has been used to designate the progeny attached to ultrafine particles that have a high diffusion coefficient and are readily deposited as opposed to the attached progeny which are attached to larger particles that are not readily diffusionally deposited.

It has long been recognized that the health risk from radon is due to the airborne alpha-emitting radon progeny. Hence the term Potential Alpha Energy Concentration (PAEC) has been used to indicate the alpha particle energy that can potentially result from alpha emitting progeny within -the decay chains of airborne radionuclides. A class of detectors, usually referred to as "working level monitors", have been developed to measure the airborne progeny. However, the design of most working level monitors will not permit measurement of the unattached fraction since plate-out occurs in the device before reaching the detector.

One of the major problems in estimating risk for persons exposed to indoor radon is the determination of the particle size distribution function of the radon progeny in air. Particularly important is that portion of the distribution that is composed of ultrafine clusters (also called the "unattached" fraction which consists of particles in the size range of 0.3–5 nm). Once this distribution, along with the total activity is known, the dose to the lungs resulting from this exposure can be calculated from a knowledge of the particle deposition characteristics of the tracheobronchial region of the lungs.

The number of progeny atoms that are deposited in various regions of the respiratory tract depends on many factors. One of the most important factors governing the deposition rates of these radon progeny in the lungs is the size distribution the aerosols to which they are attached. The point to be made is that the relationship between radon concentration in the air and lung dose is not a direct one. Rather, this relationship depends on a number of complicating factors, particularly the size distribution of the radioaerosols.

Among all sources of background radiation that deliver significant doses to the tissues or cells of the respiratory tract, inhaled radon progeny are dominant. While the natural outdoor concentration of $^{222}$Rn usually ranges between 0.07–0.2 pCi/l, indoor concentrations of radon usually range between 1 and 100 Pci/l with occasional buildings having measured radon concentrations up to 2000 Pci/l. The average annual dose to the lung bronchial epithelium of the U.S. population is 24 mSv (2.4 rem). There are estimates that the prolonged exposure to radon and its progeny may be causing 5,000 to 20,000 lung cancer deaths per year in the United States. A high radon concentration in the home environment typically results from radon gaining access from the underlying soil or from groundwater supplies. In recent years the problem of radon in indoor air has become somewhat more severe due to the design of energy efficient housing which limits air infiltration rates. It has been estimated that between 1% and 3% of U.S. homes have a radon level exceeding 8 Pci per liter. The corresponding remedial action level recommended by the Environmental Protection Agency is 4 Pci per liter. Homes are not the only structures with radon problems; office buildings, schools, commercial and military complexes all face similar problems with possibly high radon concentrations. The U.S. Government is mandated to test for radon in buildings owned and leased by the various arms of the government. The U.S. Army alone estimates that 900,000 detectors will be placed in approximately 350,000 buildings in the U.S. and overseas (DOE, 1989b).

It is well known that radon, itself a chemically inert gas, poses little biological hazard due to its low rate of retention in the body. However, the decay products of $^{222}$Rn are chemically active. Radon$^{222}$, with a half-life of 3.8 days, decays through four rapid, successive steps producing $^{218}$Po (half-life=3.11 min), $^{214}$Pb (half-life=19.8 min), $^{214}$Bi (half-life=26.8 min) and $^{214}$Po (half-life=162 $\mu$s) to produce $^{210}$Pb with a half-life=22.3 years, which effectively ends the radon decay sequence for practical dose considerations. The polonium isotopes $^{218}$Po and $^{214}$Po are the $\alpha$ particle emitters which form the major health hazard. After formation, the recoil $^{218}$Po ion rapidly loses energy, producing hydroxyl radicals and other ionized species in the particle track. The ion is subsequently neutralized and may eventually nucleate onto ions in the vicinity of the polonium ion track. The $^{218}$Po attaches to small molecular clusters and can lead to the formation of an ultrafine particle size distribution or "unattached" fraction. The ultrafine clusters can then plateout onto available surfaces, be removed by ventilation, or become attached to other aerosols in the environment. Similar pathways exist for the other radon decay progeny, with the result that the activity within the environment will be multi-modal with an ultrafine distribution in the range 0.3–5 nm and one or more distributions in the range 10–1000 nm. FIG. 1 shows typical aerosol particle distribution. These aerosol particles may be breathed into the respiratory tract of exposed persons where they are deposited on mucosal surfaces of the tracheobronchial tree and remain there until they decay. The alpha emitting radon progeny $^{218}$Po and $^{214}$Po can thus produce a significant alpha particle dose to sensitive tissues of the bronchial epithelium, which may result in later development of lung cancer.

Although it is the radon progeny that pose the dominant hazard by indoor radon, radon itself is the airborne contaminant that is generally measured because low cost measurement methods are available. Radon monitoring instrumentation ranges from the common low-cost methods using charcoal canisters to expensive electronic monitors. The drawback with these techniques is that the integration times for these monitors must be several hours to days to obtain statistically valid results due to their inherently low count rates. Measurements of the radon concentrations in a given environment are by themselves an inaccurate way to determine the health hazard presented by the radon. The only reliable way to estimate the biological hazard from the presence of the radon is to measure both the radon concentration and the number and size distribution of the airborne aerosol particulates, from which the required dosimetric parameters (PAEC, activity, lung dose, etc) can be estimated.

The important factors controlling the radon progeny radiation dose include the activity weighted size distribution of the radon progeny and the radon daughter disequilibrium (affected by such factors as room air exchange rates and aerosol levels), as well as physiological parameters such as mucus clearance rates and target tissue depth. The radiation dose depends critically on the efficiency with which the particles, to which the radon progeny are attached, are deposited in the tracheobronchial region of the lung. Particle deposition in the lung depends in turn on the size distribution of these particles and the air flow velocity in the various regions of the lung. There is a considerable need to measure these aerosol particle size distributions in order to estimate the true hazard that radon and its daughters present to the general public. Particle size measurements have traditionally been made by one of two techniques, namely electrostatic classification. Electrostatic methods can only be used in high activity concentration environments due to the low flow rates through the analyzers.

The importance of the size distribution of the radon progeny aerosols has been understood from early diffusion coefficient measurements where the existence of an "unattached" fraction in the progeny aerosol measurements was noted. The diffusion coefficients of the particles in the aerosol are inversely proportional to the size of the particles, and the existence of multivalued diffusion coefficients implies the existence of particles of different sizes. The presence of a highly diffusive component to the aerosol, in addition to a range of lower valued coefficients, in the early measurements led to the assumption that there were a class of particles characterized by a single diffusion coefficient with a particle size <5 nm (termed the "unattached" fraction), and that these particles typically constituted from 0 to 20% of the total fraction of the aerosol. Several early measurements were made with single wire screens in attempts to separate this "unattached" component from the larger "attached" aerosol fraction. More recently, it has become evident that the "unattached" fraction is actually an ultrafine distribution of particles with sizes in the range of 0.3–5 nm (see FIG. 1).

Studies have shown that single wire screen measurements cannot adequately separate out the unattached and attached components of the radon progeny aerosols, and multi screen measurements along with deconvolution procedures, must be used to obtain the true particle size distribution for these aerosols. These studies have been made using socalled graded screen arrays (GSA) where measurements are made with wire screens of different mesh sizes. These screens have different particle size collection characteristics, and performing a series of measurements with different arrays of screens gives information on the aerosol particle size distribution. These measurements have either been performed serially with one detector, or with a multiple array of detectors. The disadvantage attendant with performing serial measurements is that they are time consuming and may be unreliable due to the changing aerosol conditions in the room during the course of the measurements. The fractional penetration of the aerosol through a set of screens is obtained, the screens are replaced with another set with different diffusion and penetration characteristics, and the measurements are repeated until a series of penetration results have been obtained. The activity weighted particle size distribution can then be obtained using an unfolding technique. Alternatively, multi-detector systems have complicated plumbing, gas flow controls and data handling electronics. Neither of these techniques is ideally suited for routine surveying applications, as they are complicated, barely transportable devices, requiring extensive setup and calibration procedures to obtain reliable results. As a result, few measurements of the activity weighted particle size distribution have ever been made outside of the laboratory.

Presently, aerosol particle size and diffusion measurements are made for research purposes only. Accordingly, it would be highly desirable to use radon monitors based on lung exposure estimates derived from information on the aerosol particle size distribution to determine the radon hazard in routine surveying applications.

SUMMARY OF THE INVENTION

An object of the present invention is to provide an accurate, flexible, transportable, low cost and easy-to-use system for the direct measurement of the alpha activity weighted particle size distributions in indoor environments due primarily to radon progeny. The present invention provides better characterization of the relevant aerosol parameters, and hence a better estimates of the health hazard resulting from exposure of the general population to indoor radon than is presently possible. Further, dosimetric parameters, such as the potential alpha energy concentration (PAEC) in the environment can also be readily obtained from the same measurements.

It is also an object of the present invention to provide a more general system that will actually measure the activity weighted aerosol particle size distributions of the radon progeny in a given environment. The activity weighted particle size distribution system according to the present invention provides a direct measure of the number of alpha emitters, their energy and most importantly, their size distribution in the room environment. A number of important parameters can be calculated from this information. One of the more significant parameters is the fraction of the radon progeny that would be collected in the respiratory tract of a person exposed to the radon, from which the lung dose can be estimated as a function of age, gender and breathing rate. These measurements will eliminate the uncertainty that presently exists in estimating population doses from unknown radio-aerosol distributions. The system according to the present invention is completely different from that proposed to measure the lung dose directly, and has much wider application in the surveying and monitoring fields than does the lung exposure monitor. The lung exposure simulator feature of the present system will, of necessity, be based on a given model of lung deposition, whereas the particle size sampler feature of the system will provide basic data from which lung exposure estimates from different models can be made. The present invention utilizes wire screen collectors and low cost α particle detectors to completely characterize the size distribution of the radio-aerosols over the size range of 0.3–1000 nm. The present invention provides low-cost technology that will provide measurements of various dosimetric parameters that result from exposure of persons to indoor radon. These attractive features, combined with low cost, high portability and rapid measurement capability will reduce the health effects to the population from indoor radon.

The measurement system according to an embodiment of the present invention includes one or more wire screens which serve(s) as aerosol collectors, and low cost surface barrier a particle spectrometers which serve as sensors for a microprocessor. The microprocessor operates to control the data acquisition, unfold the particle size distributions from the measurements and calculate the various derived dosimetric quantities from these measurements. The use of the a particle spectrometers configured into a detector assembly with a suitable screen or array of screens to collect the daughter atoms (many of which are attached to particles) provides much more information than a radon detector alone. Almost all of the health risk associated with indoor radon is due to the daughter atoms and these can be measured directly with the sampler according to the invention. Further, the invention makes use of the fact that the detection of collected daughter atoms is much more sensitive than the detection of radon alone, and the improved counting statistics which result from the radon progeny measurements can lead to rapid and accurate measurement of the activity and particle size distribution. Further, the use of wire screen technology for the collectors allows the collection characteristics of the detector to be easily changed in order to optimize the characteristics for various types of measurements.

The system according to the invention can be used in radon surveys to provide information on the activity weighted particle size distributions in schools, homes, and commercial, public, and other buildings. Another important use for this system is in research applications to study aerosol characteristics for different source conditions, ventilation rates, etc, thereby increasing the understanding of the factors leading to increased lung exposure and hence the real biological hazards associated with radon in the environment. This information can be directly used to estimate the lung exposure, among other quantities, resulting from exposure to radon in indoor air.

It should be noted that the present invention involves the use of general alpha particle spectrometers and has wider applications than just radon. For example, airborne radionuclides could be monitored in the uranium and thorium mining and processing industries. Similarly, workers exposed to plutonium dust in fuel reprocessing facilities could also benefit from such technology.

BRIEF DESCRIPTION OF THE DRAWINGS

FIG. 3a. The α particle energy spectrum for the $^{218}$Po (peak energy=6.0 MeV) and the $^{214}$Po (peak energy=7.7 MeV) obtained with the detector observing the front of the screen.

FIG. 3b. The α particle energy spectrum obtained from the back side of the screen.

DETAILED DESCRIPTION OF THE PREFERRED EMBODIMENTS

Figure 2:
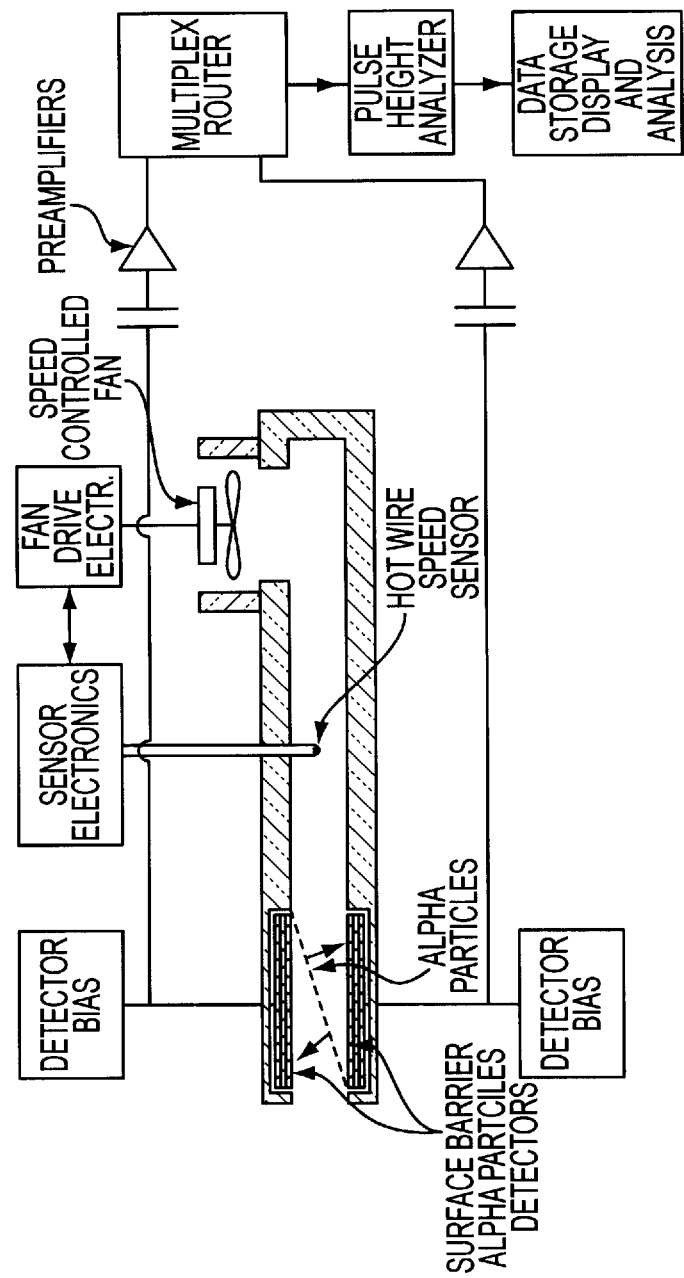
FIG. 2 is a schematic diagram showing the measurement system according to an embodiment of the invention.

FIG. 2 shows a first embodiment of the particle size measurement according to the invention. As shown in FIG. 2, the system includes an air flow channel 2, which includes surface barrier alpha particle detectors 4, 4, a mesh wire screen 5 for collecting radon products, sensor electronics 6 connected to a hot wire speed sensor 8 and fan drive electronics 10 for driving a speed controlled fan 12. The system further includes detector bias circuits 14, 14 for the respective detectors 4, 4, preamplifiers 16, 18, a multiplex router 20, a pulse height analyzer 22, and a data storage display and analysis unit 24. (which may be, for example, a PC).

The detector air flow channel 2 can be made from plexiglass and covered with aluminum foil so as to act as an electromagnetic shield for the solid state α particle detectors 4, 4. The total channel length according to this embodiment is 7", the channel width is 1.75", and the depth is 0.25", giving an air flow channel area of 2.8 cm$^2$. These dimensions were chosen so as to maximize the collection efficiencies of the two α particle detectors 4, 4, minimize the spread of the α particle energies, and reduce the possible interference between adjacent detectors in a full scale device. The price that was paid was that the rate of air flow through the device was lower than optimal leading to lower count rates than might be possible with a larger air flow channel area. The fan 12 can be a simple low cost speed controlled 12 volt fan as the air mover through the unit, and the air sensor electronics 6 provides signals to the fan 12 in accordance with the sensed air speed from the hot wire speed sensor 8 to precisely control the air flow rate through the channel 2. For example, fan 12 can be a fan measuring 1.5"×1.5"×0.3711 which can be obtained from Radio Shack at a cost of approximately $20. This fan allows air flow velocities up to 50 cm/s to be maintained through the channel 2. The significance of this feature is that it allows for small, compact, and truly portable systems, and there is no need for atmospheric pressure pumps and associated plumbing when using wire screen arrays rather than filters.

As shown in FIG. 2, the signals from the α particle detectors 4, 4 are fed into a multiplexer 20 via preamps. 16, 18, routed to a multichannel pulse height analyzer 22, and then stored and displayed in unit 24 (which, as indicated, can be a PC computer). A typical α particle energy spectrum obtained by the system shown in FIG. 2 is shown in FIGS. 3a and 3b. Specifically, the activity from the front of the screen is provided in FIG. 3a, and the activity from the back is provided in FIG. 3b. For these particular measurements, a 400 mesh screen and an air flow velocity of 15 cm/s were used. Under these conditions, the screen 5 only removes particles with diameters below 5–10 nm from the air stream. The measurements were obtained in an environment which had a measured radon level on the order of 1 pCi/l. The observed instrument count rate for these measurements being≈5/min.. An important feature to note from these measurements is that a significant fraction of the aerosol is deposited on the back of the screen 5. Specifically, under the experimental conditions noted above, approximately 30% of the activity comes from the back of the screen 5, indicating that counting the activity from the front and back of the screen considerably increases the count rate (and therefore the sensitivity) of the measurement system. These measurements also show that there is good separation between the $^{214}$Po and the $^{218}$Po isotope peaks allowing accurate estimates of the individual activities to be made.

Figure 4A:
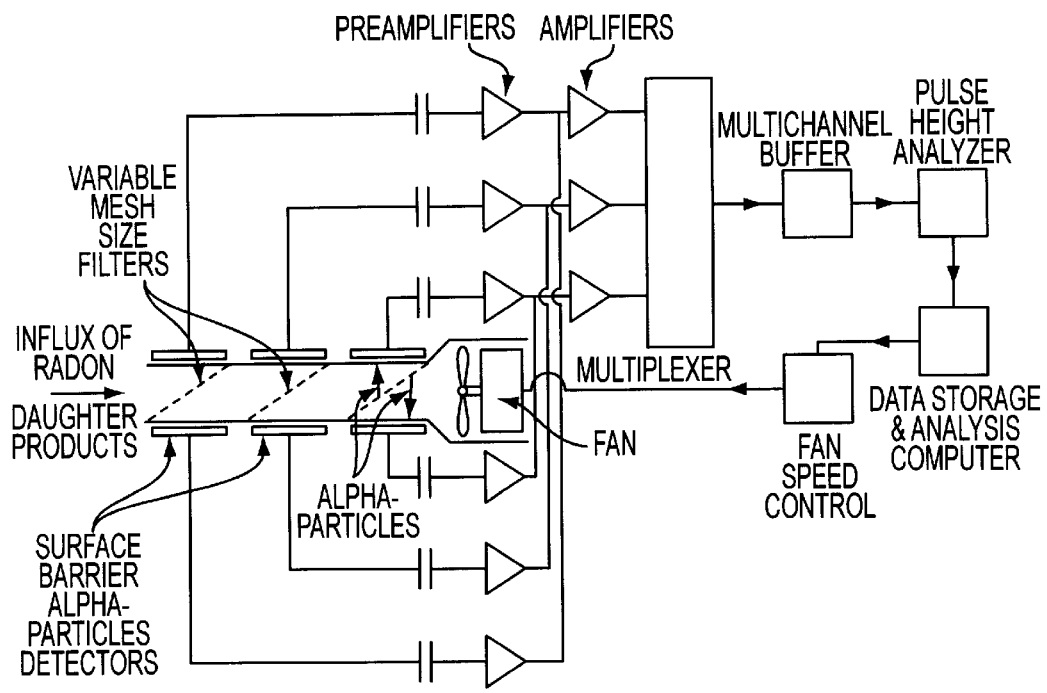
FIG. 4. Schematic diagrams of the activity weighted particle size sampler showing (a) the overall layout and electronics used in this monitor, and (b) the actual design of the air flow channel and locations of the screens and α particle detectors. (c) The inset shows the speed controlled fan used alternately as the air mover in the instrument.

FIG. 4a shows a second embodiment of the invention in which three mesh screens are employed. As shown in FIG. 4a, the system includes three screens 5, 5, 5, each of which is disposed between opposing surface barrier alpha particle detector 4. The outputs of each of the detectors 4 is supplied to a muliplexer 20 via preamplifiers 16 and amplifiers 17. In the embodiment of FIG. 4a, a fan speed control circuit 26 controls the fan 12, in accordance with an output from display and analysis unit 24. The unit 24 receives the output from pulse height analyzer 22 which is connected to receive the output of multiplexer 20 via multi-channel buffer 21.

The design and geometry of the radon particulate collector/detector is based on the wire screen technology developed by Hopke, et al. (1990). The operation of the system shown in FIG. 4a will now be described.

Air, containing radon progeny aerosols, is first drawn into the air flow channel 2 and passes through the three variable mesh size filters 5 which preferentially collect specific fractions of the aerosol. The particulate collectors used in the mesh filters 5 are based on the wire screen technology developed by Hopke, et al. (1989). The rate of air flow through the channel 2 also determines the collection characteristics of the filters 5 and must be carefully controlled. The low cost speed controlled fan 12 discussed above in connection with FIG. 2 can be used as the air mover in the present system. The fan 12 is in contrast to most other active radon monitoring technologies where atmospheric pressure pumps (costing several hundred dollars) must be used. The simple fan 12 is able to be used in this system because there is essentially a zero pressure gradient across the wire screens 5 at the air flow rates anticipated in the present measurements. There is also a considerable advantage when developing commercial measurement systems to using low cost, quiet, compact, easily controllable and transportable fans and blowers as the air movers in these systems.

The measurement system shown in FIG. 4a employs fan 12 to obtain room aerosol measurements similar to those obtained using the one screen system shown in FIG. 2.

Figure 4B:
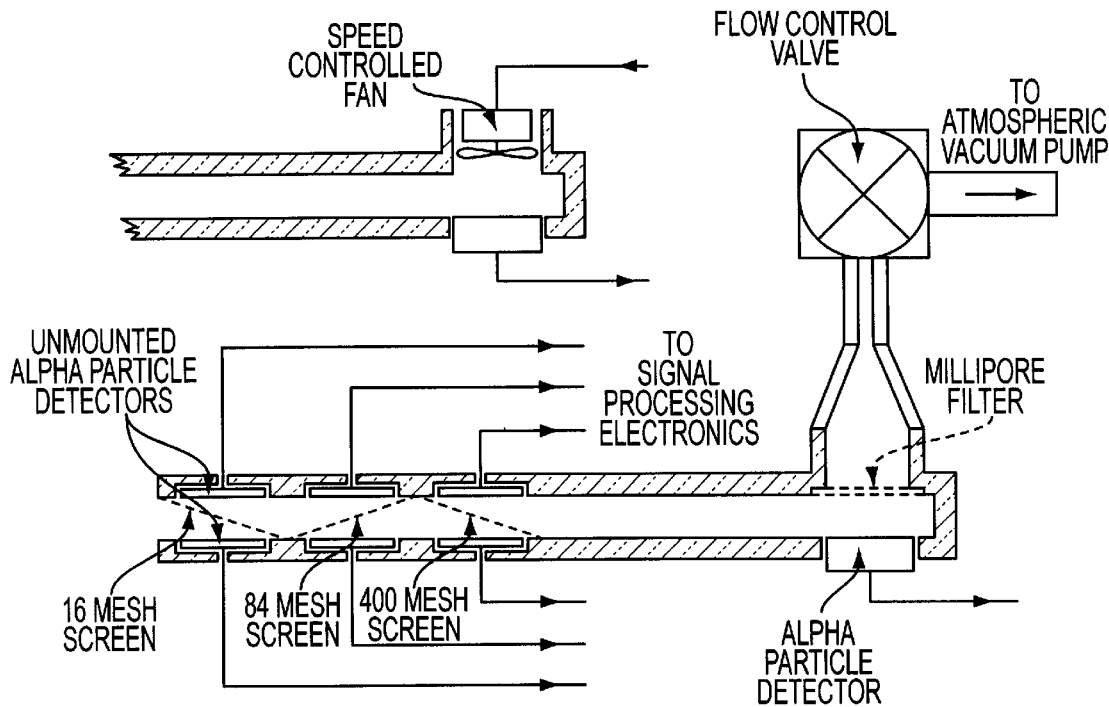

FIG. 4b shows an alternative embodiment in which an atmospheric pressure pump 28 and associated flow control valve is used as the air mover. Similar to the embodiment shown in FIG. 4a, the embodiment of FIG. 4b employs three variable mesh screens. Specifically, as shown in FIG. 4b, 16 Mesh, 84 Mesh and 400 Mesh screens are employed. The system shown in FIG. 4b is able to collect the ultrafine fraction of the radioaerosol on the multi-screen array, as well as the fraction of the aerosol that was not deposited on the screens. In order to perform this, a millipore filter 32 is located at the end of the air flow channel in front of the pump inlet, and an α particle detector is located in the channel wall opposite the filter. The α particle detector is located 5 mm from the surface of the filter 32 which causes a small loss in energy resolution. In contrast, the average screen distance from the α particle detectors in the system depicted in FIGS. 2 and 4a is 2–3 mm.

FIG. 4c shows an alternative air move design for the system of FIG. 4b. In FIG. 4c, the vacuum pump 28 is replaced with a speed controlled fan 12. The surface barrier α particle detectors 4 used in the FIGS. 2 and 4a–c systems are low-cost, real-time, multi-channel, alpha particle spectrometers for the detection of radon and its daughter products.

The design of the α particle spectrometer assembly 4 is based on detecting the α particle emitters in the decay of $^{222}$Rn to $^{210}$Pb. During this process $^{222}$Rn emits a 5.5 MeV α particle, $^{218}$Po emits an α particle of 6.0 MeV, and $^{214}$Po emits an α particle of 7.7 MeV. There are intervening β particle decay processes such that the effective half life in going from $^{218}$Po to $^{210}$Pb is about 45 minutes. The product $^{210}$Pb is a β particle emitter with a half life of 22 years. Thus the specific activity drops to the point where the health risk is no longer concern. The detection and energy resolution of the 6 MeV and the 7.7 MeV α particles produced during this decay sequence was an essential feature of the detector design. The α particle spectrometers 4 are solid-state detectors such as Quantrad 500-PNC-BNC diffused junction Si detectors (costing approximately $225 in units of one). The signals from the detectors 4 are passed to, for example, Ortec NIM APAD modules (Model No. A576) which provide the detector bias, signal amplification and pulse shaping (see, for example, units 14, 16, 17 and 18 in FIGS. 2 and 3a). The shaped pulses are then multiplexed by the multiplex router 20 which may be, for example, an oxford digital multiplexer router (Model No. DMR 108A). The resultant signals are pulse height analyzed and counted in unit 22 which may be, for example, a Nucleus pulse height analyzer/multi-channel scaler (Nucleus PCA II) located on a board inside a personal computer. The recorded signals are stored and displayed on the computer (unit 24).

An important feature of the invention is the aerosol sampling characteristics of the wire screens used in the variable mesh filters 5. The utility of wire screens as aerosol samplers was greatly enhanced when Cheng and Yeh (1980; see also Cheng et al., 1980; Yeh et al., 1982) developed a theory for particle penetration and deposition on wire screen filters. The equation governing the deposition or collection C of a particle by a wire screen is given by $$C = 1 - P = 1 - \exp\left[-\frac{4\alpha' n' w' E_t'}{\pi(1-\alpha)d_f'}\right]$$

where n=number of screens, $d_f$=wire diameter, w=wire screen thickness, a=solid volume fraction and $E_t$=single fiber collection efficiency.

For particle sizes below 300 nm, only diffusional terms are important in the collection efficiency calculations (Ramamurthi, 1989), and $E_t$ is $$E_t = E_D = 2.7 \, Pe^{-2/3}$$

where $Pe=d_f U/D$ is the Peclet number, D is the diffusion coefficient and U is the air flow velocity through the screen. For larger particle diameters, other processes such as interception, impaction, and diffusional interception become significant and must be accounted for in the calculated response function of the wire screen filter array. In this case $E_t$ is given by:

$$E_t = E_D + E_I + E_R + E_{DR}$$

be accounted for in the calculated response function of the wire screen filter array. In this case $E_t$ is given by:

$$E_t = E_D + E_I + E_R + E_{DR}$$

where $E_D$ is the single fiber efficiency due to diffusion, $E_I$ is due to interception, $E_R$ is due to impaction and $E_{DR}$ is due to diffusional interception. The equations for these additional parameters are given by Cheng et al. (1980) and depend on parameters such as the Stokes number, wire screen thickness, wire diameter, solid volume fraction, etc. These equations show that the probability that a particle of a given size penetrates the filter depends on the size of the screen parameters, the number of screens used and the air flow velocity, and have been shown to accurately predict the screen collection characteristics over a wide range of particle sizes from ≈0.3 nm to 1000 nm (Yeh et al., 1982; Cheng et al., 1985; Scheibel and Porstendorfer, 1984; Reineking and Portstendorfer, 1986; Holub and Knutson, 1987, Ramamurthi et al., 1990).

Figure 5A:
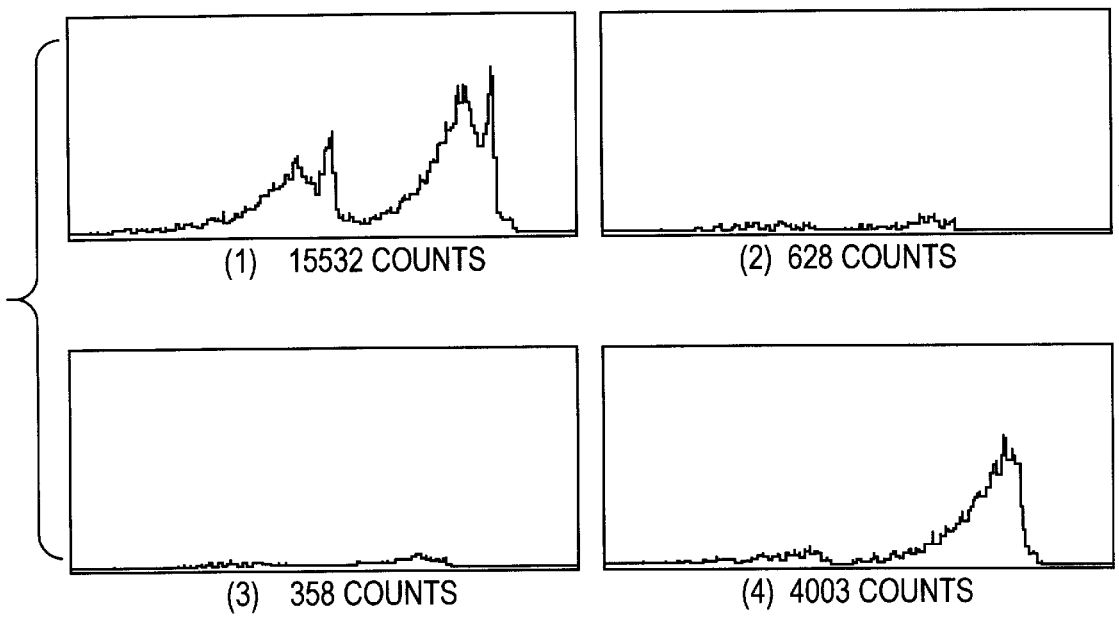
FIG. 5. Ultrafine aerosol measurements. Chamber radon level=180 pCi/l. Progeny activities:- $^{218}$Po=3700 Bq/m$^3$, $^{214}$Pb+$^{214}$Bi=270 Bq/m$^3$. (a) Energy spectrum and total counts from the three screens (1–3) and the filter (4). Counting time=12.5 hours; (b) Screen penetration and collection characteristics. Air flow velocity=7.5 cm/s.
Figure 5B:
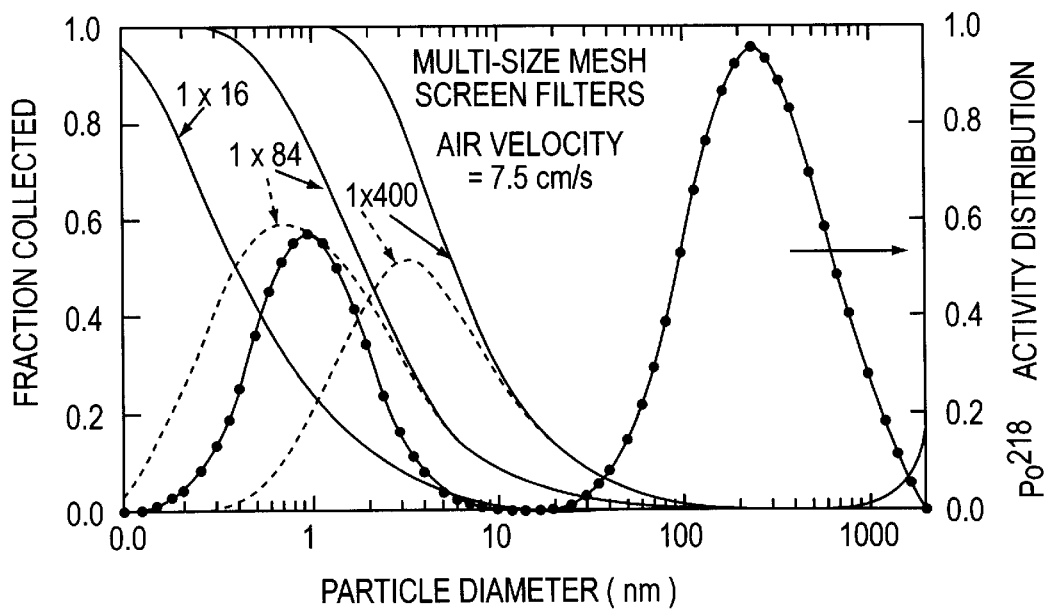
Figure 6A:
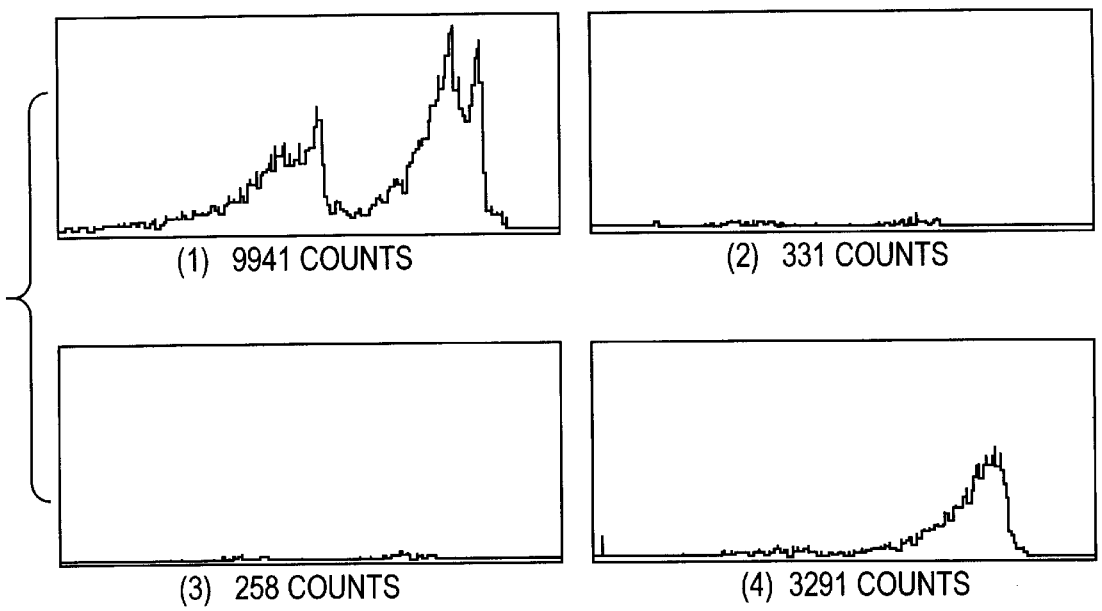
FIG. 6. Ultrafine aerosol measurements. Chamber radon level=180 pCi/l. Progeny activities:- $^{218}$Po=3700 Bq/m$^3$, $^{214}$Pb+$^{214}$Bi=270 Bq/m$^3$. (a) Energy spectrum and total counts from the three screens (1–3) and the filter (4). Counting time=2.8 hours; (b) Screen penetration and collection characteristics. Air flow velocity=15 cm/s.
Figure 6B:
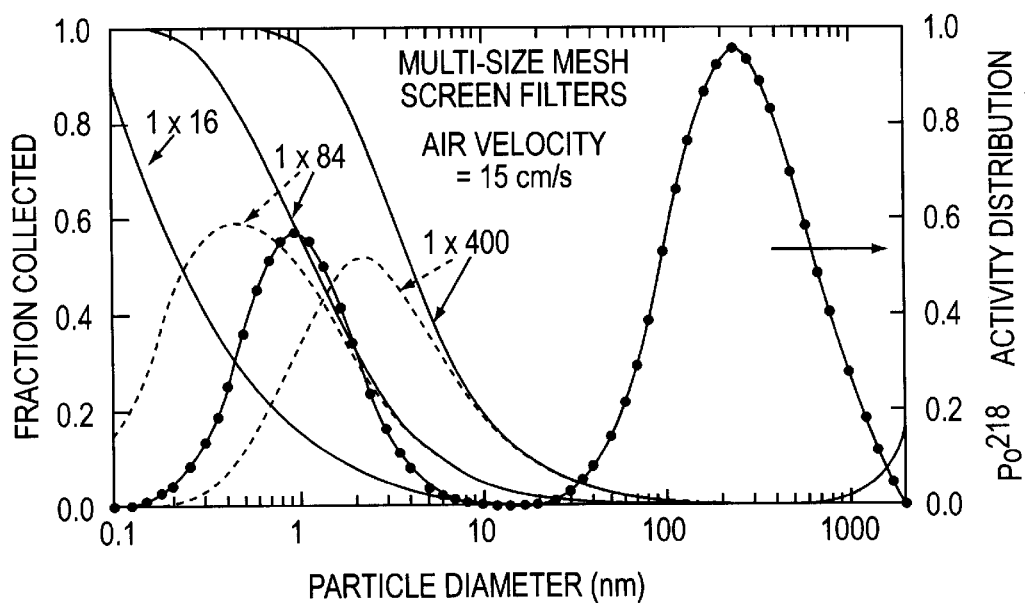
Figure 7A:
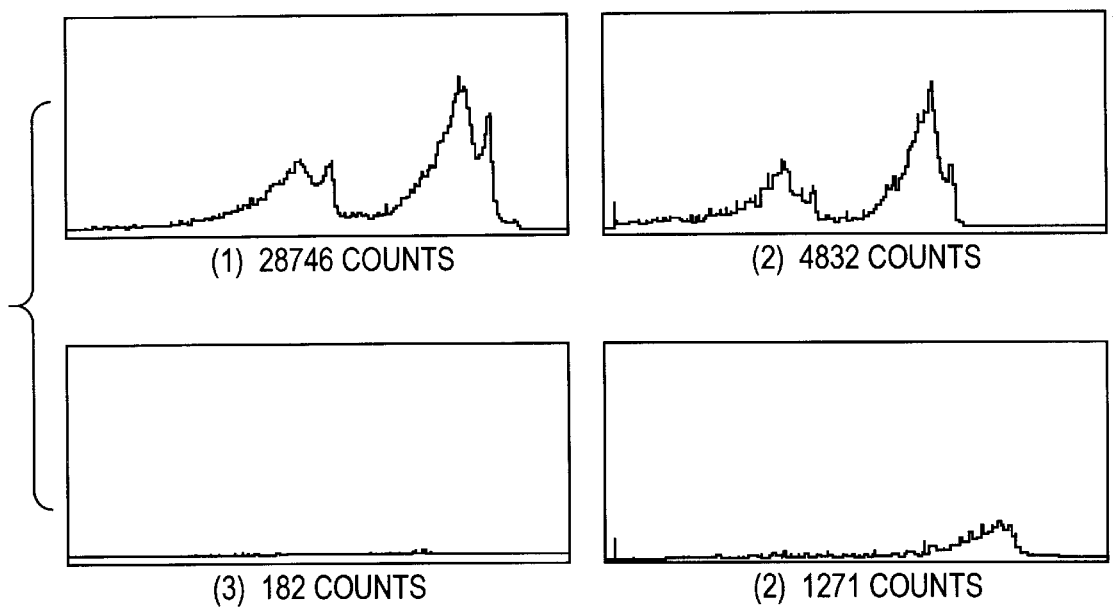
FIG. 7. Ultrafine aerosol measurements. Chamber radon level=180 pCi/l. Progeny activities:- $^{218}$Po=3700 Bq/m$^3$, $^{214}$Pb+$^{214}$Bi=270 Bq/m$^3$. (a) Energy spectrum and total counts from the three screens (1–3) and the filter (4). Counting time=2.8 hours; (b) Screen penetration and collection characteristics. Air flow velocity=30 cm/s.
Figure 7B:
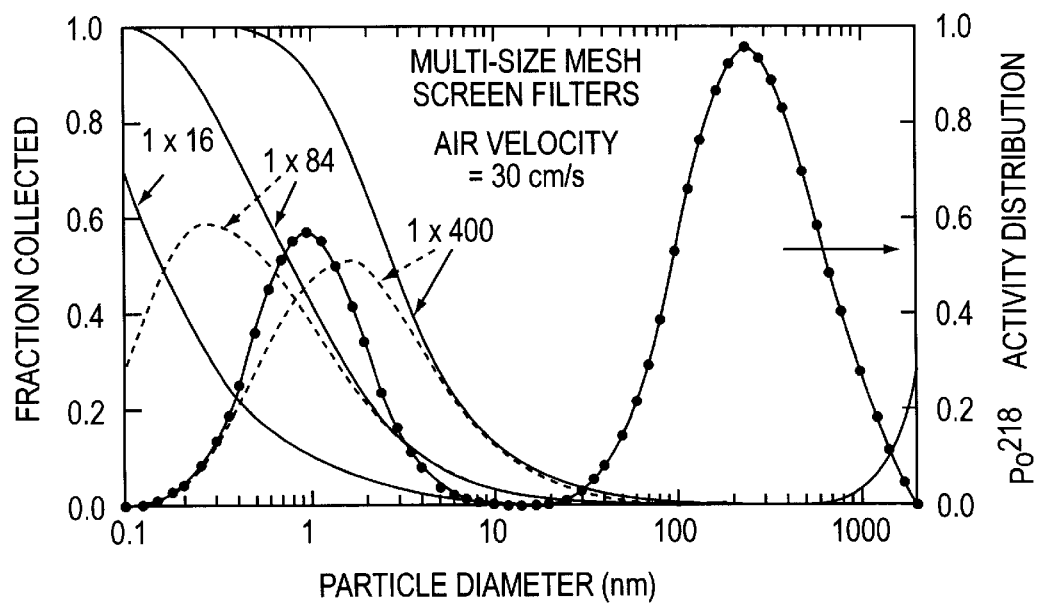

Using these equations, it is possible to design an array of screens with a given aerosol. particle size collection characteristics. FIGS. 5b–7b show calculations at three air flow velocities for the array of three screens designed to measure the ultrafine fraction of a typical radio aerosol particle size distribution used in the present system. Also shown in these figures are the experimental $^{218}$Po particle size distribution measurements (solid circles) of Reineking and Porstendorfer (1990). These measurements show a bimodal distribution with the smaller sized distribution peaked around 1 nm and a larger sized distribution peaked around 250 nm. The smaller sized distribution has been termed the "unattached" or ultrafine fraction (eg. Ramamurthi and Hopke, 1989), and the present sampler is able to measure the unattached particle size distribution of known radio aerosols. The three screen arrays shown in these figures have been designed to efficiently collect the ultrafine fraction of the aerosol over the particle size distribution up to ≈10 nm, depending on the flow velocities as shown in the figures, while having a low collection efficiency for the larger sized particles present in most typical room air aerosols. The solid lines in FIGS. 5b–7b show the calculated collection characteristics for each screen combination separately. The dashed lines for the 84 and 400 mesh screens and the solid line for the 16 mesh screen show the actual fraction of the aerosol that is collected by each of the screen combinations. One of the unique features of the measurement system according to the present invention is that the detector 4 can measure the α particle activity on each of the screen combinations separately using a common air stream. With this technique, the system is able to sample a small fraction of the particle size distribution over as wide a particle size range as desired, with as fine a resolution as is required to obtain enough measurements to enfold the true particle size distribution from the measurements. With the screen combinations shown in FIGS. 5–7, there is a wide separation between the peak collection efficiencies of the screens as a function of particle size. It is a simple matter to increase the number of screen combinations if higher collection efficiencies over a particular particle size range are required. It should be understood that the combinations shown in FIGS. 5–7 are not necessarily the optimum combinations of screens to use in this application, but have been chosen to illustrate the versatility which is available in selecting the appropriate screen collection characteristics in any given aerosol environment.

The following sets forth demonstration measurements which were made using two radon containing chambers. The first consists of a large radon aerosol chamber constructed of stainless steel with outer dimensions of 6'×4'×4' (volume≈2.4 m$^3$). This chamber was carefully cleaned, and highly filtered air containing $^{222}$Rn at a known activity level was slowly passed through the chamber. Under these conditions the concentration of particles, 5 nm or larger, in the chamber was measured to be <1 cm$^{-3}$. The measured radon concentration in the chamber during these measurements was ≈6600 Bq/m$^3$ (≈180 pCi/l), and the individual progeny activities were as follows; $^{218}$Po≈3700 Bq/m$^3$ and $^{214}$Pb+$^{214}$Bi≈270 Bq/m$^3$. Measurements of the system's response to the ultrafine aerosol, which is present in the chamber under these conditions, were made in this environment. The second smaller chamber, constructed of plexiglass with a volume≈1 m$^3$, was used to perform measurements of the system's response to aerosols containing larger monodisperse particles, and subsequently used to measure the sampler's particle plateout characteristics.

Measurement of the sampler's response to an ultrafine aerosol are given in FIGS. 5 to 7 at three different screen velocities (7.5, 15, and 30 cm/s, corresponding to air flow volumes of 2.4, 4.8, and 9.5 cubic feet per hour respectively). Four sets of α particle energy spectra were obtained from the measurement system at each of these air flow velocities and are given in each figure, along with the calculated response of each of the screens at these velocities. Spectra (1) to (3) are measurements obtained from the front of the three screens in the sampler (FIG. 4), and the fourth spectrum was obtained by counting the activity deposited on the millipore filter located in front of the pumping orifice. An atmospheric pressure pump such as is shown in the measurement system of FIG. 4b was used to obtain these results. The spectra show the α particle energy spread from the decay of the $^{218}$Po (6.0 MeV) and the $^{214}$Po (7.7 MeV) radioisotopes. The first wire screen spectra in each figure shows double valued peaks for each isotope; the sharper and higher energy peak comes from the decay of the polonium isotopes deposited on the surface of the a detectors and the broader lower energy peaks are from the decay of the polonium deposited on the wire screens. With the present geometry, there is no problem in sorting the relative contributions from the two isotopes to the total deposited activity.

Figure 1:
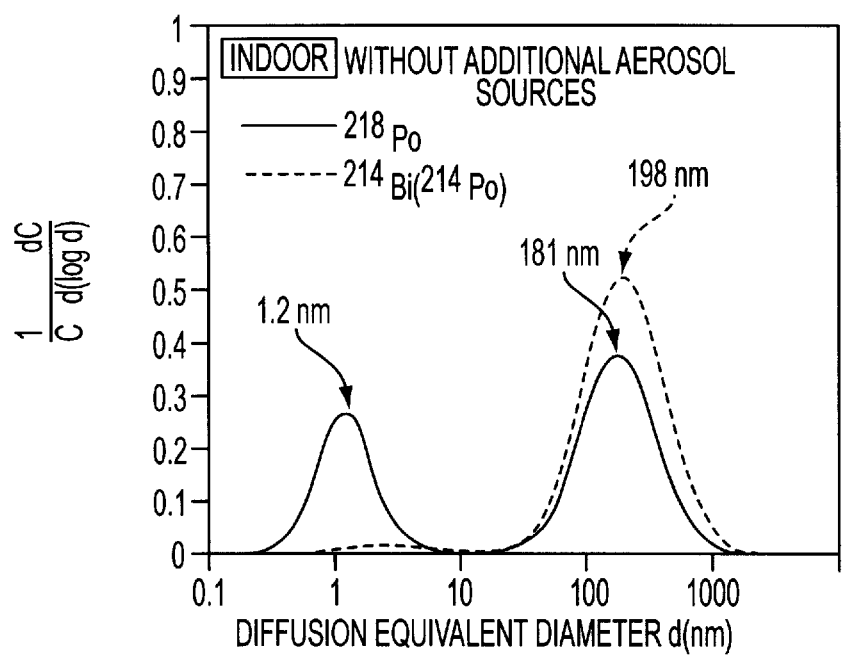
FIG. 1 is a graph showing a typical activity size distribution for $^{218}$Po and $^{214}$Pb/$^{214}$Po.

The calculated response curves and the sampler measurements show that as the air flow velocity is increased, the wire screens sample an increasingly smaller fraction of the larger sized aerosol, such that the activity on the subsequent larger mesh screens increases with air velocity. This is particularly noticeable in the relative responses of screens (1) and (2) at 7.5 and 30 cm/s (FIGS. 5 and 7 respectively). Another interesting observation to note is that although the wire screens remove nearly all the $^{218}$Po from the air stream (as evidenced by the very low count rate from the 6.0 Mev α particles collected on the millipore filter - spectra no. (4) in each figure) a considerable count rate for $^{214}$Po (7.7 MeV) is observed on the millipore filter. These measurements indicate that the majority of the $^{218}$Po isotope is indeed unattached with particle sizes in the 0.5 nm size range, while the $^{214}$Pb and $^{214}$Bi resides on particles greater than 10 nm in size. The explanation for these results is that the majority of the $^{218}$Po detected by our sampler does not reside in the chamber long enough after it's decay from the $^{222}$Rn to attach to the few remaining large particles in the chamber, before itself decays (half life=3.1 minutes). The detected $^{214}$Po on the other hand must by necessity have come from the decay of $^{214}$Pb and $^{214}$Bi which have a residence times in the chamber of several tens of minutes. This is ample time for these radioisotopes to collide and coalesce with even the low concentration of particles remaining in the chamber. These results are also qualitatively in agreement with the room air results obtained by Reineking and Porstendorfer (1990) for room air, except that in their measurements, the considerably higher concentration of particles in the unfiltered room allows a fraction of the $^{218}$Po to attach to these particles before undergoing further decay. An attached $^{218}$Po fraction results with particle sizes in the range 50–500 nm (FIG. 1).

Measurements of the measurement system's response in an atmosphere containing monodisperse NaCl aerosols were made in the smaller radon chamber. The techniques for generating and measuring these aerosols are described elsewhere (Ramamurthi et al., 1991, 1993; Li et al., 1992, 1993; Winkimayr et al., 1990). Two monodisperse particle sizes were used, namely 20 nm and 50 nm, and the results of the 50 nm study are given in FIG. 8. The results from the 20 nm study are similar to, but not as clear as, the 50 nm particle study, as the testing was able to generate an order of magnitude higher concentration of the 50 nm particles (measured concentration=1.5–2.0×10$^4$ cm$^{-3}$) than the 20 nm particles, which was at the lower limit of the particle classifier's range (measured concentration=1.5–2.0×10$^3$ cm$^{-3}$). In these studies the atmosphere in the radon chamber contained an ultrafine radio aerosol similar to that in the large chamber, and in addition, contains the monodisperse, much larger sized particle distribution. The 90% wings of the 50 nm distribution was estimated to be <±10 nm from previous studies (e.g. Li et al., 1992; Li and Hopke, 1993).

Figure 8A:
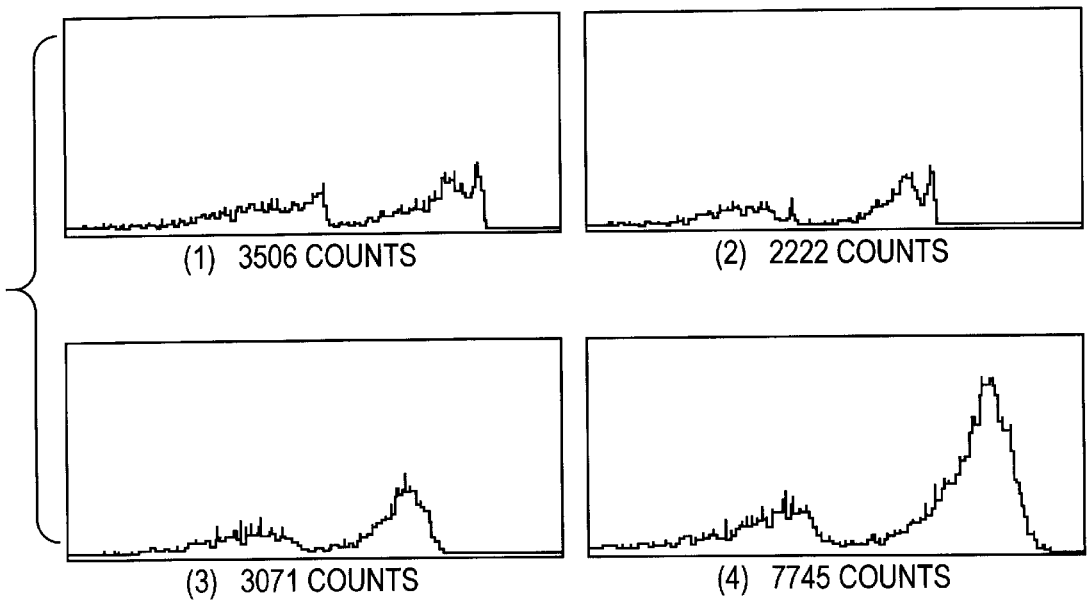
FIG. 8. Screen collection measurements. 50 nm particles, Activity; $^{218}$Po=3000 Bq/m$^3$, $^{214}$Pb+$^{214}$Bi=1200 Bq/m$^3$. Particle concentration=1.6×10$^4$ cm$^3$ (a) Air flow velocity=7.5 cm/s. Counting time=9.7 hours. (b) Air flow velocity=15 cm/s. Counting time=2.5 hours.
Figure 8B:
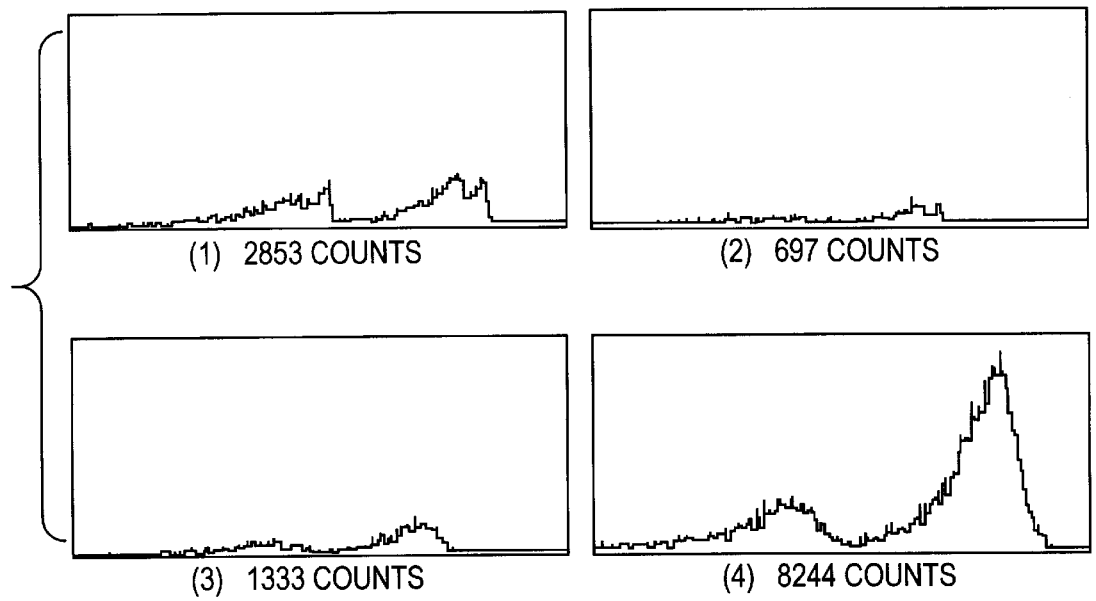

The measurements obtained at two air flow velocities are given in FIG. 8, namely 7.5 cm/s (FIG. 8a) and 15 cm/s (FIG. 8b). Four α particle energy spectra are again shown for each measurement; spectra (1) to (3) are for screens (1) to (3) respectively, and spectra (4) is the activity from the aerosol deposited on the millipore filter. Radio isotope plateout on the α particle detectors is again evident by the sharp energy peaks on the first two screens, but is essentially absent from the third screen. In these 50 nm particle studies there is obviously a much higher count rate on screens (2) and (3) than in the previous ultrafine aerosol studies made under the same conditions (compare FIG. 8a and 8b with FIG. 5a and FIG. 6a respectively). These measurements show that as the air flow velocity is increased a smaller fraction of the 50 nm aerosol is collected on screens (2) and (3), and is instead collected on the filter (4). Again this is in agreement with the expected trend where, as the air velocity through the screens is increased, the deposition of the larger sized particles decreases. In contrast, the results in FIGS. 5 to 7 show that as the air velocity increases, the deposition of the ultrafine aerosol increases on the screens (2) and (3). This is the result predicted by the screen deposition calculations shown on FIGS. 5b to 7b.

Figure 9A:
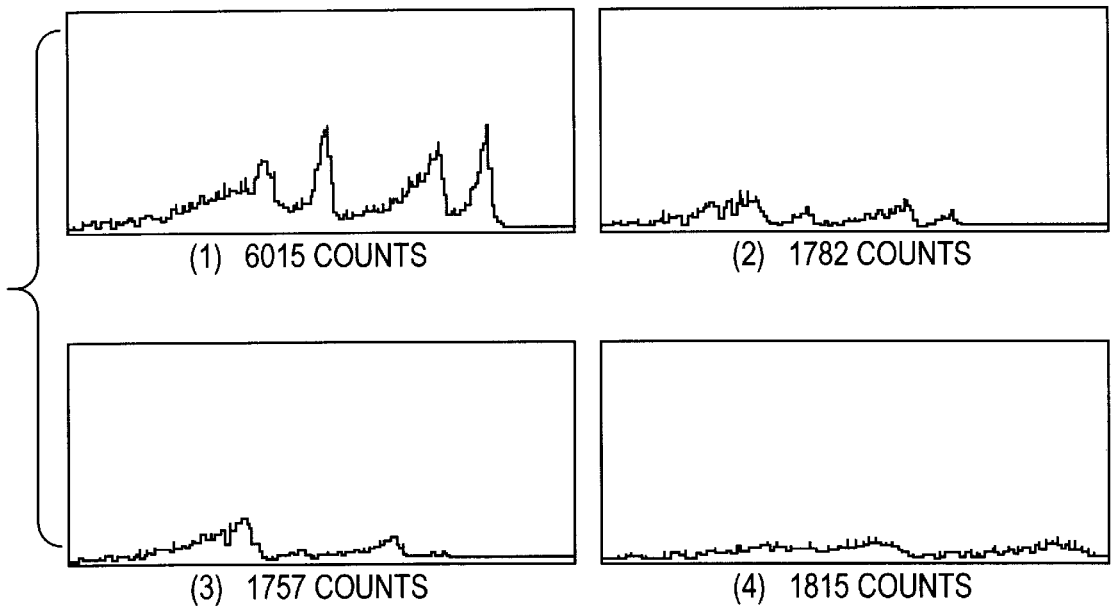
FIG. 9. Plateout measurements with the screens removed from the detector. Air flow velocity=7.5 cm/s. Counting time=9.7 hours (a) No particles, Activity; $^{218}$Po=2500 Bq/m$^3$, $^{214}$Pb+$^{214}$Bi=90 Bq/m$^3$ (b) 50 nm particles, Activity; $^{218}$Po=3000 Bq/m$^3$, $^{214}$Pb+$^{234}$Bi=1200 Bq/m$^3$. Particle concentration=1.2×10$^4$ cm$^{-3}$ FIG. 10. Aerosol collection characteristics of a six-screen sampler. The symbols are the same as in FIGS. 5–7. For each screen combination, the first number is the number of screens and the second number is the mesh size of the wire screens. The air flow velocity in this example calculation was 9 cm/s.
Figure 9B:
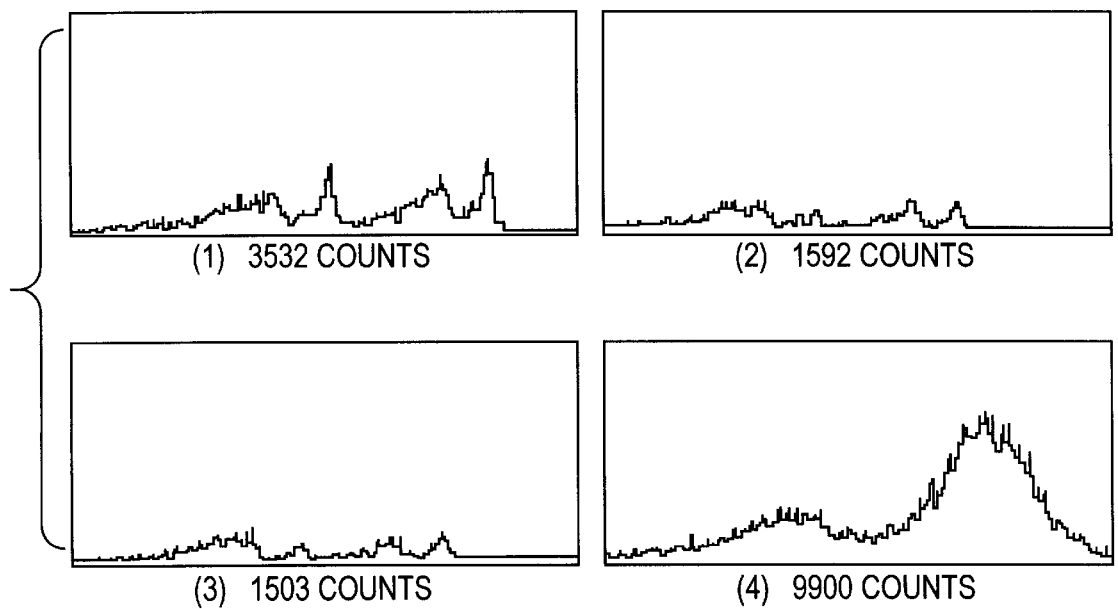

Both the ultrafine aerosol and 50 nm particle measurements shown above indicated, as expected, that there was a significant amount of plateout of the ultrafine aerosol occurring at the front of the sampler containing the first two wire mesh screens. A series of measurements were performed with the screens removed from the sampler to study the magnitude of this signal and its contribution to the overall measured sampler response. The measurements, performed at an air flow velocity of 7.5 cm/s, are shown in FIG. 9. The contribution due to plateout is expected to be greatest at the lowest air velocity used in this study. The results in FIG. 9a are for the ultrafine aerosol, and the measurements with a 50 nm aerosol are given in FIG. 9b.

As expected, the plateout signal is greatest at the first detector, and is considerably diminished at the two subsequent detectors. In this case, the two peaks at each α particle energy are due to the decay of the progeny deposited on the surface of the detector (the higher energy, sharper peaks) and on the detector and surfaces directly opposite the active detector (the lower energy, broader peaks). In these measurements, the plateout on the third detector was still significant, while with the screens present, the results in FIG. 8 show that the plateout on this screen was negligible. It is interesting to note in FIG. 9a that for the ultrafine aerosol, the $^{214}$Po signal from the millipore filter is much lower in the small radon chamber than it is for the large chamber (compare with FIG. 5a). In the small chamber most of the $^{214}$Pb and $^{214}$Bi plateout on the walls of the chamber before they have a chance to grow to a significant size and be detected by our sampler. The measured activity for the ultrafine aerosol was; $^{218}$Po≈2500 Bq/m$^3$, $^{214}$Pb+$^{214}$Bi≈90 Bq/m$^3$. Similar results are obtained when the aerosol is added to the chamber, except in this case the plateout rate on the first detector was considerably reduced, even though the chamber radon decay progeny activities were considerably higher. The measured activities with the 50 nm aerosol present were; $^{218}$Po≈3000 Bq/m$^3$, $^{214}$Pb+$^{214}$Bi≈1200 Bq/m$^3$. The presence of the 50 nm particles has enabled some of the $^{218}$Po and other progeny to attach to these particles, thus reducing their plateout rate on the walls of the chamber leading to the increased activities and a much higher count rate on the millipore filter (FIG. 9b, detector no. (4)). Although the plateout rates for the ultrafine fraction are large in this measurement system (as will be the case for all other radon sampling instrumentation), the plateout is measurable and quantifiable and can be accounted for in determining the particle size distributions with this instrument.

The system was designed specifically to minimize the possibility of interference from adjacent detectors. The large changes in the measured signals from adjacent detectors shown in FIGS. 5 to 7 indicate that cross talk with the geometry chosen is negligible.

In the ultrafine measurements given in FIGS. 5 to 7, the actual progeny count rates in the sampler were as follows; ≈15 counts/pCi/l/hour at an air speed of 7.5 cm/s, ≈50 counts/pCi/l/hour at an air speed of 15 cm/s, and ≈125 counts/pCi/l/hour at an air speed of 30 cm/s. These measurements were obtained with only one of the detectors actively counting the activity from the screens. There was also measurement of the ratio of the activity on the front screen with the 50 nm particles in the chamber, and observed a front/back ratio≈1.5/1.0 counts in one run at 15 cm/s, and a ratio≈1.2/1.0 counts at an air speed of 7.5 cm/s. These ratios are larger than previously reported (Holub and Knutson, 1987) primarily due to the use of diagonal screens such that the back detector is actually seeing part of the front of the wires in the screen (FIG. 4). Consequently, adding the signal from both detectors will considerably improve the signal strength. The present findings indicate that the air flow could be easily increased by a factor of 2 to 3 and still maintain good resolution, more than adequate in a situation where it is really only needed to separate the α particle peaks, and it is not necessary to know the shape of the energy spectra. It is believed that system count rates of 500 to 2000 counts per hour or more can readily be achieved in low to moderate radon containing environments (4–20 pCi/l). These numbers compare very favorably with presently used samplers as all particle size samplers face the same low count rate problem in low radon concentration environments. The specific advantages that the measurement system according to the present invention has over presently used devices is its potential for high detection efficiency, low cost (few hundred dollars), ease of transportation (no external pumps required and possible battery operation), and increased specificity (its ability to separate the $^{218}$Po and $^{214}$Po peaks, and the fact that the system performs true difference measurements, measuring only the activity falling on each of the screens separately).

The system according to the invention was specifically designed to maximize energy resolution of the α particles, and as the energy spectra shown in FIGS. 5 to 8, the α particles are well resolved. These α particle energy peaks would still be adequately resolved even with a larger air flow channel (i.e., greater separation between the screens and the detectors), which would improve the sensitivity of the sampler.

The striking differences in the response of the measurement system to aerosols containing only an ultrafine component (FIGS. 5 to 7) and an aerosol containing the 50 nm particles (FIG. 8) indicate that the sampler, as designed, has no trouble in separating the ultrafine fraction from an aerosol containing larger particles.

Radon concentration is the quantity which is usually measured from which risk is to be determined. However, much more than radon concentration, the quantity on which regulatory limits are placed, must be known to estimate the risk. The equilibrium fraction, i.e. the fraction of the radon progeny still airborne, would need to be known. Then the particle size distribution on which the radon progeny are attached would need to be known. Unfortunately, the radon concentration, the equilibrium fraction, and the particle size distribution all may change dramatically in only a few minutes in a typical indoor environment. Hence, simultaneous measurements of these three quantities would have to be known in each small time interval, delta t. A model for the collection characteristics of the human respiratory system could then be applied and the lung exposure for this delta t could be estimated. However, this would have to be done for each delta t and integrated over time to estimate the total exposure. The measurement system according to the present invention measures directly the particle sizes on which the daughters are attached and identifies which daughter, $^{218}$Po or $^{214}$Po, that is present. The system then integrates over time or can record the values at any desired time intervals. It thus directly measures the information needed to apply any model for lung deposition to estimate the lung exposure.

Figure 10:
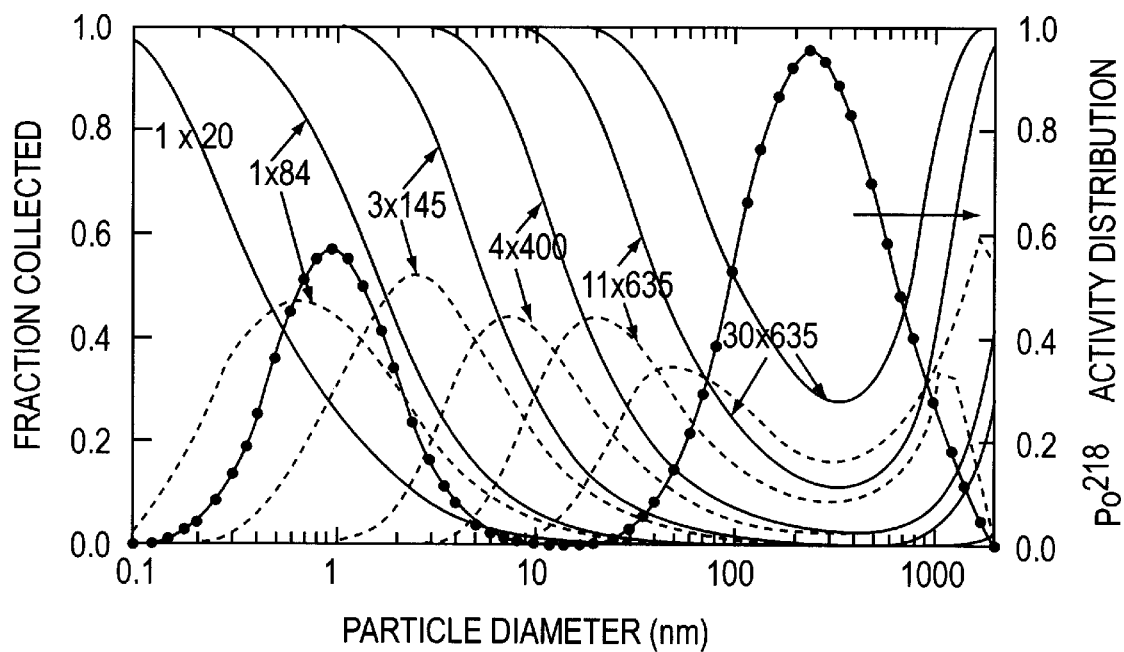

While several embodiments of the invention have been discussed, it should be noted that more sophisticated versions of the measurement system incorporating 6 or more wire screen arrays with particle collection characteristics uniformly distributed over the entire particle size range of interest (specifically from 0.1 to 500 nm) can be used. The calculated response of such a detector for a given wire screen combination and air flow velocity is shown in FIG. 10. The solid circles in FIG. 10 are a set of "typical" particle size distribution measurements, the solid lines are the collection characteristics of the individual wire screen arrays, and the dashed lines are the actual fractions of the aerosol distribution collected by each of the screen arrays. The calculations shown in FIG. 10 indicate that there is adequate separation between the peak collection efficiencies of each of the screen arrays, and that the overall peak detection efficiency for each of the screens in the system is in the range of 30–50%. With the screen combinations shown in the figure, the collection efficiency is 100% for particle sizes up to 20 nm, and decreases to 50% for particle sizes of 120 nm. The minimum collection efficiency of the screen combinations shown in FIG. 10 is ≈30% at 350 nm. With other combinations of screens and air flow velocities, it is possible to obtain a near unit collection efficiency over the whole range of particle sizes of interest. For example, if a combination of 30 micromesh screens (as opposed to the wire mesh screens used in most research particle size samplers) with a mesh count of 2000 are used, it is possible to obtain minimum collection efficiencies of over 95% at particle sizes of 150 nm. The added advantage of micromesh screens is that the hole shape and solid to open area ratio can be specially ordered for any required optimum configuration. These micromesh screens can be obtained from, for example, the Buckbee-Mears Company. These screens will allow higher air flow rates (and hence higher count rates) while preserving the same particle deposition characteristics on the screens. It should be noted that the calculations shown in FIG. 10 are only one of many possible combinations of screen arrays and air flow velocities, and are not necessarily an optimized set.

A significant problem to be addressed in the design of any particle size sampling instrument is the potential for plateout of the ultrafine fraction of the radioaerosol on the entrance orifice and the walls of the air flow chamber. Previous studies have shown that a significant fraction of the dose to the tracheobronchial region of the lungs comes from the ultrafine fraction, and it is important that the measurement system of the invention accurately measure this part of the particle size distribution. The radon progeny plateout on the a particle detector and walls of the air flow chamber is a strong function of the air flow velocity. Plateout can be a problem in that it reduces the overall efficiency of the system and contributes to the a particle detector signal background. Designing the system to have a larger air flow velocity will decrease the plateout rate in the system and increase the transport of air through the chamber, thereby improving the count rate. However, too high an air velocity across the wire screen mesh leads to turbulence however giving unpredictable plateout rates on the wires of the screens. Accordingly, careful study is required to find the optimum compromise in these circumstances.

An alternate technique for increasing the count rate with the measurement system according to the present invention is to increase the area of the screen collector and the α particle detector while maintaining the same flow rate. Although this may increase the cost of the overall measurement system, the increased sensitivity of the system may justify the increased expense in certain monitoring applications. The count rate actually increases more rapidly than linear with increases in the collector and α particle detector areas due to an improvement in the geometrical collection efficiency with a small reduction in the energy resolution of the detected α particle spectrum. Plateout problems may increase somewhat with a larger area detector but can also be compensated for by increases in the air flow velocity through the channel.

One of the major advantages of the measurement system of the present invention is the relatively rapid response of the system to changes in the radon progeny activity in the area being surveyed. There are questions concerning the response time of the system to rapid changes on the radon concentration, when for instance, an air conditioning unit is switched on, a gas stove is lit, or a door or window is opened or closed. In surveying situations, a rapid response time is required, and this may be achieved by monitoring only the $^{218}$Po isotope. Since the half life of the $^{218}$Po isotope is short (half life=3.1 min) compared with the effective half life of $^{214}$Po (effective combined half life of $^{214}$Pb, $^{214}$Bi and $^{214}$Po≈45 min), monitoring the $^{218}$Po isotope alone will allow near real time changes in the activity weighted particle size distribution in the environment to be made. However, the major drawback with this procedure is that the equilibrium concentration of the $^{214}$Po in the room and on the collection screens in the system may be considerably higher than the $^{218}$Po. Unless the radon concentrations are moderately large (several pCi/l) the $^{218}$Po signal by itself may be too weak to give an accurate indication of the room activity. It may be possible to use the initial changes (derivative) in the total detected activity (of both the $^{214}$Po and $^{218}$Po isotopes) as an indication of the radon progeny activity on each of the screens in the room environment without having to wait for both of the polonium isotopes to come into equilibrium (approximately 2.5–3 hours).

It should be understood that several different versions of the measurement system according to the invention can be made. For example, a system could be used mainly as a surveyor for monitoring the activity and particle size distribution in environments where significant exposure may result. Several significant markets could be envisioned for this type of monitor system. The first is for a hand held instrument that could be used in routine surveying applications, such as the home resale market, schools, post offices and other government buildings. In large commercial and government buildings permanently installed instruments could be used to monitor radon and particulate levels and thus air quality. This system could provide monitoring and control signals for the building HVAC system or other specific radon mitigation devices. A final application would be as a personnel system where, if the instrumentation could be sufficiently miniaturized, an individual with a significant risk of environmental exposure could be monitored on a routine basis. Such applications are in the uranium and thorium mining and processing industries, reactors and various other manufacturing environments where significant levels of dust containing α emitters are possible.

Figure 11:
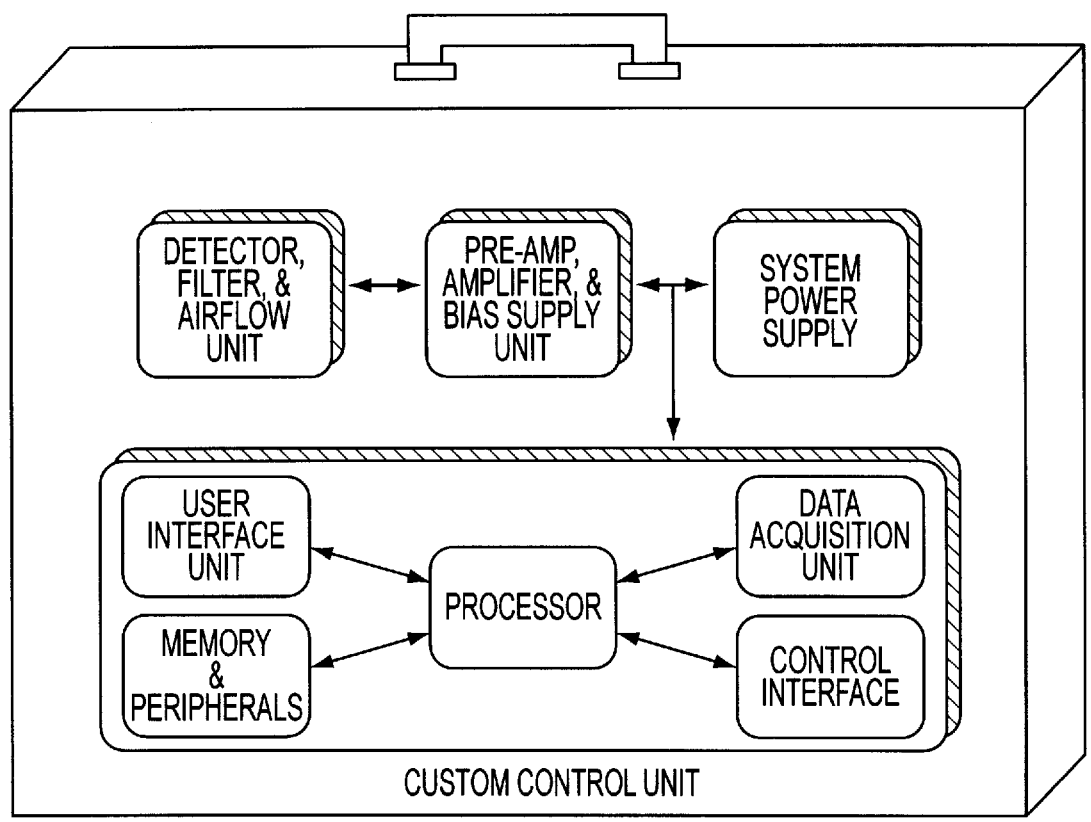
FIG. 11. Schematic of a portable monitor according to the invention.

FIG. 11 shows a portable measurement monitor system according to another embodiment of the invention. As shown in FIG. 11, the monitor system includes a portable NIM Minibin which will contain the detector collection screens, the α particle detectors and the speed controlled fan to establish the air flow through the collection screens. A hand held version of the system containing the air flow channel, particle wire mesh screen filters, α particle detectors, and fan will also be constructed and electrically connected to the NIM electronics. The data acquisition, analysis and storage circuitry can be housed within a personal computer.

The measurement systems according to the present invention can include provision for the generation of warning and control signals. For example, the microprocessor in PC 24 can easily be programmed to provide a control signal to activate an alarm and/or mitigation device if the measured lung dose exceeds a predetermined value. Ample memory will also be included in the system to store the measured values at regular time intervals. This data can then be downloaded at a later time to monitor the long term performance of any mitigation technology installed in the building being monitored.

One of the advantages of the measurement system according to the invention is not only the monitoring of the activity level of the radon progeny in the environment, but also the size distribution of the radioaerosols, from which actual lung exposure and other relevant dosimetric parameters can readily be obtained. In this regard, the system provides a direct measure of the health threat and turns the radon mitigation system on and off in response to that threat and consequently provides efficient protection for the building's occupants. Excessive use of mitigation devices (at an unnecessary expenditure of energy) can be avoided because of more accurate dosimetry.

Another advantage of the invention is in continuously monitoring the effectiveness of the mitigation equipment. In many cases mitigation will be effected through air exchange to pressurize the building and thus prevent radon entry. However, this process requires energy consumption, particularly in areas where large differences between inside and outside temperatures must be maintained. The ability to turn off the air exchange when not needed could result in significant energy savings. Present methods for mitigation control based on building pressurization are also often unreliable. For example, the Air Force presently has responsibility for several thousand buildings on Guam, many of which have elevated radon levels. The nature of the soil renders subsurface ventilation impractical and pressurization is the preferred mitigation technology. Mitigation equipment based on pressurization was installed in many buildings and within one year 60 percent had failed. Continuous monitoring would provide a warning of such failure and thus could insure that occupants are protected.

Having described the invention in detail, those skilled in the art will appreciate that numerous modifications may be made of the invention without departing from its spirit. Therefore, it is not intended that the scope of this invention be limited to the specific embodiments illustrated and described. Rather, it is intended that the scope of the invention be determined by the appended claims and their equivalents.

What is claimed is:

1. A system for measuring the size distribution of particles on which radioactive atoms are attached, the system comprising:

an air flow channel for receiving radioactive atoms and particles;

an air mover unit for controlling the air flow rate in said channel;

at least one wire mesh screen filter disposed within said channel;

at least two alpha particle detectors disposed on opposite sides of the air flow channel so as to detect the radioactive atoms and their daughter products deposited on the front and back sides of the wire mesh screen filter; and an analysis unit coupled to receive outputs of said alpha particle detectors.

2. The system defined in claim 1, wherein the at least one wire mesh screen filter is diagonally located within the air flow channel.

3. The system defined in claim 1, wherein at least one of the alpha particle detector is located on the top wall of the air flow channel, and wherein at least one of the alpha particle detector is located on the bottom wall of the air flow channel.

4. The system defined in claim 1, wherein there are at least two wire mesh screen filters which are spaced from each other within the air flow channel.

5. The system defined in claim 4, wherein each of said filters has a different mesh value.

6. The system defined in claim 4, wherein each filter contains one or more closely spaced wire mesh screens.

7. The system defined in claim 6, wherein the wire mesh screen for each filter is of different mesh size.

8. The system defined in claim 4, wherein there is a same number of alpha particle detectors as there are wire mesh screen filters.

9. The system defined in claim 8 wherein each alpha particle detector is located in the wall of the air flow channel adjacent to a wire mesh screen filter, so as to detect the radioactive particles and their daughter products located on that filter.

10. The system defined in claim 4, wherein there is a pair of alpha particle detectors associated with each of the wire mesh screen filters.

11. The system defined in claim 10, wherein the wire mesh screen filters are located between each pair of alpha particle detectors, said pair of detectors located on the top and bottom walls of the air flow channel, respectively, so as to detect the radioactive particles and their daughter products located on both the front and back sides of the associated wire mesh screen filter.

12. The system defined in claim 10, further comprising a millipore filter and an additional alpha particle detector, said millipore filter being disposed opposite to said additional alpha particle detector.

13. The system defined in claim 11, further comprising an air speed monitor.

14. The system defined in claim 13, wherein the air speed monitor is operable to control and stabilize the speed of the air in the air flow channel.

15. The system defined in claim 10, wherein said air mover unit is a fan.

16. The system defined in claim 10, wherein said air mover is a vacuum pump.

17. A method for measuring the size distribution of particles on which radon atoms are attached comprising:

receiving radon atoms in an air flow channel;

controlling an air flow rate in the channel;

disposing one or more wire mesh screen filters within the channel; and detecting radon atoms and their daughter products on each side of the wire mesh screen filters.

* * * * *